United States Patent
Chew et al.

(10) Patent No.: US 11,494,196 B2
(45) Date of Patent: Nov. 8, 2022

(54) INFORMATION-PROCESSING DEVICE DELETING UNSPECIFIED DEVICE INFORMATION TO COMPLETE SETUP PROCESS

(71) Applicant: BROTHER KOGYO KABUSHIKI KAISHA, Nagoya (JP)

(72) Inventors: Po Chun Chew, Nagoya (JP); Mayumi Mio, Nagoya (JP); Jun Komura, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 80 days.

(21) Appl. No.: 17/001,304

(22) Filed: Aug. 24, 2020

(65) Prior Publication Data

US 2021/0064387 A1  Mar. 4, 2021

(30) Foreign Application Priority Data

Aug. 27, 2019 (JP) .............................. JP2019-154878
Sep. 5, 2019 (JP) .............................. JP2019-162216

(51) Int. Cl.
*G06F 9/4401* (2018.01)
*G06F 3/12* (2006.01)

(52) U.S. Cl.
CPC .......... *G06F 9/4413* (2013.01); *G06F 3/1204* (2013.01); *G06F 3/1225* (2013.01)

(58) Field of Classification Search
None
See application file for complete search history.

(56) References Cited

U.S. PATENT DOCUMENTS

| | | | |
|---|---|---|---|
| 6,697,073 B1 | 2/2004 | Kadota | |
| 2010/0138596 A1* | 6/2010 | Hayashi | G06F 12/0893 711/E12.007 |
| 2010/0141987 A1* | 6/2010 | Miyamoto | H04N 1/00222 358/1.15 |
| 2018/0144109 A1* | 5/2018 | Kamakura | G06F 21/629 |

FOREIGN PATENT DOCUMENTS

| | | |
|---|---|---|
| JP | 2000-242454 A | 9/2000 |
| JP | 2018-81448 A | 5/2018 |

* cited by examiner

*Primary Examiner* — Frantz Bataille
(74) *Attorney, Agent, or Firm* — Kenealy Vaidya LLP (57) ABSTRACT

In an information-processing device a controller executes a storage process to store a command program in a memory. The command program supports the target device and outputs commands to the target device. In a case where the memory does not store the command program, an OS executes a plug and play process for a target device triggered by connection of the target device to the communication interface, and records in the memory unspecified device information indicating that the target device is unknown. In a case where the memory stores the unspecified device information, the OS does not complete a setup process even if the memory stores the command program. The controller executes, after executing the storage process, a deletion process to delete the unspecified device information from the memory so that the OS can complete the setup process.

15 Claims, 7 Drawing Sheets

INFORMATION-PROCESSING DEVICE DELETING UNSPECIFIED DEVICE INFORMATION TO COMPLETE SETUP PROCESS

CROSS REFERENCE TO RELATED APPLICATION

This application claims priority from Japanese Patent Application Nos. 2019-154878 filed Aug. 27, 2019 and 2019-162216 filed Sep. 5, 2019. The entire content of each of these priority applications is incorporated herein by reference.

TECHNICAL FIELD

The present invention relates to a program and an information-processing device.

BACKGROUND

Some printers support a function known as Plug and Play (hereinafter abbreviated as "PnP"). An information-processing device known in the art executes a setup program in order to set up a printer driver on the device. Once the printer driver has been set up, the PnP function allows the printer to be connected to the information-processing device by a cable or disconnected from the information-processing device while the power to the information-processing device is on.

SUMMARY

However, once the printer is connected to the information-processing device before the printer driver is set up, if the information-processing device tries to set up the printer driver thereafter, the information-processing device cannot shift to a state where the printer can be used with the printer driver.

In view of the foregoing, it is an object of the present disclosure to provide a technology enabling an information-processing device to use a printer through a printer driver in various situations.

In order to attain the above and other objects, the disclosure provides a non-transitory computer readable storage medium storing a set of program instructions installed on and executed by an information-processing device having a controller, a memory, and a communication interface. The memory stores an OS configured to execute a plug and play process for a target device that is connected to the communication interface. The set of program instructions includes: executing a storage process to store a command program in the memory, the command program supporting the target device and for outputting commands to the target device, wherein in a case where the memory does not store the command program, the OS executes the plug and play process for the target device triggered by connection of the target device to the communication interface, and records in the memory unspecified device information indicating that the target device is unknown, wherein in a case where the memory stores the unspecified device information, the OS does not complete a setup process to enable the command program stored in the memory to output the commands to the target device even if the memory stores the command program; and executing, after executing the storage process, a deletion process to delete the unspecified device information from the memory so that the OS can complete the setup process to enable the command program to output the commands to the target device triggered by connection of the target device to the communication interface.

According to another aspect, the disclosure provides an information-processing device. The information-processing device includes a communication interface, a memory, and a controller. The memory stores an OS configured to execute a plug and play process for a target device that is connected to the communication interface. The controller is configured to perform: executing a storage process to store a command program in the memory, the command program supporting the target device and for outputting commands to the target device, wherein in a case where the memory does not store the command program, the OS executes the plug and play process for the target device triggered by connection of the target device to the communication interface, and records in the memory unspecified device information indicating that the target device is unknown, wherein in a case where the memory stores the unspecified device information, the OS does not complete a setup process to enable the command program stored in the memory to output the commands to the target device even if the memory stores the command program; and executing, after executing the storage process, a deletion process to delete the unspecified device information from the memory so that the OS can complete the setup process to enable the command program to output the commands to the target device triggered by connection of the target device to the communication interface.

BRIEF DESCRIPTION OF THE DRAWINGS

The particular features and advantages of the disclosure as well as other objects will become apparent from the following description taken in connection with the accompanying drawings, in which.

DETAILED DESCRIPTION

An embodiment will be described while referring to drawings. However, it would be apparent to those skilled in the art that various changes and modifications may be made therein without departing from the scope of the invention. For example, an order of processes or steps described below will be modified without departing from the scope of the invention.

Figure 1:
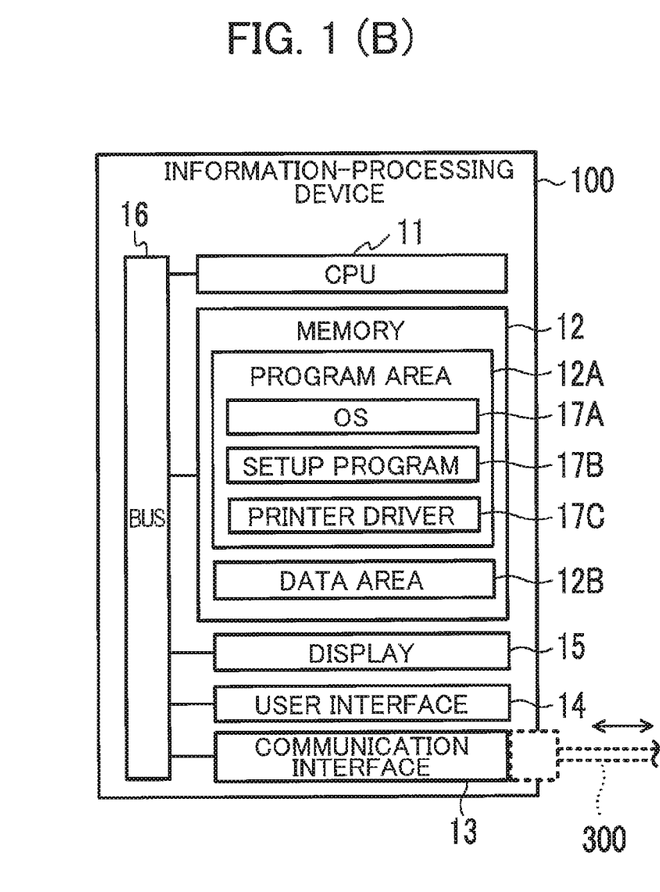
FIG. 1(A) is a schematic diagram illustrating a printing device and an information-processing device according to an embodiment.
FIG. 1(B) is a block diagram illustrating electrical structures of the information-processing device.

As shown in FIG. 1(A), an information-processing device 100 and a printing device 200 are connected by a communication cable 300. In the embodiment, the communication cable 300 will be described as a cable conforming to the Universal Serial Bus (USB; registered trademark) standard.

The information-processing device 100 is a personal computer or the like. The information-processing device 100 is provided with a CPU 11, a memory 12, a communication interface 13, a user interface 14, and a display 15 that are connected to and capable of communicating with each other via a communication bus 16.

The CPU 11 reads various programs stored in the memory 12 and executes the programs to control the overall operations of the information-processing device 100. The CPU 11 is an example of the computer.

The memory 12 may be configured of a storage medium, such as ROM, RAM, EEPROM, or HDD; and a buffer or the like provided in the CPU 11. The memory 12 may be any storage medium that can be read by a computer. The storage medium is a non-transitory, tangible medium. Note that electric signals conveyed along a transmission path, such as the Internet, are one type of a computer-readable storage medium, but are not a non-transitory, tangible storage medium.

The memory 12 has a program area 12A and a data area 12B. The program area 12A is a storage area for storing an OS 17A, a setup program 17B, a printer driver 17C, and various other programs. The setup program 17B is an example of the program and is commonly called an "installer." The setup program 17B can instruct the OS 17A to set up the printer driver 17C to support a plurality of predetermined models (i.e., a plurality of types of printing devices 200). The printer driver 17C is an example of the command program. In the following description, the setup program 17B and the printer driver 17C may be simply referred to as the program 17B and the driver 17C. Additionally, each of the plurality of types of printing devices 200 supported by the driver 17C will be collectively referred to as the "target printing device 200" in the following description.

The OS 17A is a basic program of the information-processing device 100. The program 17B may be a single program or an aggregate of program modules. The program 17B executes a storage process for storing the driver 17C in the program area 12A, while the OS 17A executes the setup process for setting up the driver 17C (see FIG. 2). Through these processes, the driver 17C can output various commands to the printing device 200. Here, when the OS 17A sets up the driver 17C, the OS 17A assigns the driver 17C which is stores in the program area 12A to the printing device 200 so that the information-processing device 200 can output print commands to the printing device 200 using the driver 17C.

Various information and various data are inputted into and outputted from the OS 17A and the program 17B during the storage process and the setup process. To give a specific example, the program 17B creates or acquires display data representing various screens to be displayed on the display 15, and outputs the created or acquired display data to the OS 17A. The OS 17A displays screens represented by the inputted display data on the display 15 (see FIGS. 3 and 4).

The data area 12B is a storage area for storing various information and various data used by the various programs.

The communication interface 13 supports or conforms to the USB standard. The communication interface 13 includes a connector. The user or administrator of the printing device 200 inserts a connector of the communication cable 300 into the connector of the communication interface 13 or extracts the connector of the communication cable 300 from the connector of the communication interface 13. Hereinafter, the terms "administrator" and "user" will be collectively referred to as simply "user." The communication interface 13 outputs signals to the OS 17A specifying a prescribed voltage level in response to the communication cable 300 transitioning from a non-inserted state in the connector of the communication interface 13 to an inserted state.

The user interface 14 accepts input operations performed by the user. The user interface 14 includes a keyboard, mouse, and the like. The keyboard outputs operation information to the CPU 11 corresponding to the keys operated by the user. The mouse outputs position information to the CPU 11 indicating positions the user has specified in a screen displayed on the display 15. Note that the user interface 14 may include other well-known input devices, such as a pen-type input device, in addition to the keyboard and mouse. The display 15 is a liquid crystal display or the like.

When the driver 17C (see FIG. 1) is set up (installed) on the information-processing device 100, the information-processing device 100 can transmit print commands and the like to the printing device 200. However, if the printing device 200 is connected to the information-processing device 100 by the communication cable 300 before the driver 17C has been set up, the OS 17A in the information-processing device 100 executes a well-known Plug and Play process (hereinafter called the "normal PnP process") in conjunction with the printing device 200 connected to the information-processing device 100 by the communication cable 300. The normal PnP process is also executed when the printing device 200 is connected to the information-processing device 100 by the communication cable 300 white the driver 17C is not stored in the program area 12A of a memory 12. In this case, the OS 17A records unspecified device information in the data area 12B of the memory 12 indicating that the printing device 200 is an unspecified device. One example of the data area 12B for storing unspecified device information is a region in Registry concerning USB. To give a specific example, if the OS 17A of the information-processing device 100 is Windows (registered trademark) and the driver 17C has not been set up on the information-processing device 100, Windows cannot identify the driver 17C, and the printing device 200 cannot transmit a USB device descriptor to the information-processing device 100. Consequently, Windows recognizes the printing device 200 as an "unknown device," i.e., an unspecified device.

In order to remove this unspecified device from the memory 12, a process for deleting the unspecified device from the memory 12 could be performed just before the setup program 17B (see FIG. 1(B) is started. However, since many types of printing devices 200 are available on the market, attempting to remove an unspecified device through such a process just prior to starting the setup program 17B may result in any of various failures.

Once the driver 17C has been set up, the information-processing device 100 can transmit print commands and the like for the printing device 200 to the communication cable 300 through a communication interface 13. A print command includes image data and printing conditions. The image data represents an image to be printed on the printing device 200. The printing conditions specify how the image is to be printed on a sheet, such as the printing resolution, and the type and size of the sheet. The information-processing device 100 transmits the print command to the printing device 200 via the communication cable 300. The printing device 200 is an example of the device and may be a printer, a multifunction peripheral, or the like. A multifunction peripheral possesses a print function, a fax function, a copy function, and the like. Upon receiving a print command, the printing device 200 prints an image based on the image data on a sheet according to the printing conditions, and discharges the printed sheet from the device.

The CPU 11 performs the processes described below according to instructions in the programs. In the following description, actions such as "determine," "extract," "select," "calculate," "decide," "identify," "acquire," "receive," "control," "set," and the like represent processes performed by the CPU 11. Processes performed by the CPU 11 include processes that control hardware through a controller such as the OS 17A. Note that the term "acquire" in this specification is used as a concept that does not necessarily require a request. In other words, a process by which the CPU 11 receives data without requesting that data is included in the concept of "the CPU 11 acquires data." The term "data" described herein is expressed as bit strings that can be read by a computer. Data of different formats are treated as the same data when the content of the data is essentially the same. The same holds true for "information" in this specification. An "instruction," a "response," a "request," or the like is processed by communicating information indicating the "instruction," the "response," or the "request." The terms "instruction," "response," and "request" may also be used to describe information indicating an "instruction," a "response," or a "request."

A process executed by the CPU 11 according to instructions described in a program may be described using abbreviated expressions, such as "the CPU 11 executes," "the program 17B executes," and "the information-processing device 100 executes." Similarly, the input and output of information performed by a program via the communication interface 13 or user interface 14 may be described in abbreviated terms, such as "the CPU 11 receives," "the program 17B transmits," or "the information-processing device 100 acquires."

Further, a process performed by the CPU 11 to determine whether information A indicates circumstance B may be described conceptually as "determining whether circumstance B based on information A." A process in which the CPU 11 determines whether information A indicates circumstance B or circumstance C may be described conceptually as "determining whether circumstance B or circumstance C based on information A."

The terms "data" and "information" used in this specification share aspects of being bits or bit strings that computers can handle. The computer treats "data" without considering the significance of its individual bits. In the case of "information," on the other hand, the computer's operations branch based on the significance of the individual bits. Additionally, a "command" is a control signal prompting the destination device to perform the next operation. A command may include information and may itself possess the properties of information.

Further, "data" and "information" are treated as the same data and information even when the format (such as a text format, binary format, or flag format) is modified for different computers, provided that the computers can recognize the same content. For example, information specifying the number "two" may be stored in one computer as information in the text format for the ASCII code "0x32", and may be stored in a different computer as information in the binary format for the binary notation "10".

However, the distinction between "data" and "information" is not strictly enforced; exceptions to the rule may be allowed. For example, data may be temporarily treated as information, while information may be temporarily treated as data. Further, certain bits or bit strings may be treated as data on one device and information on another. Further, information may be extracted from data, and data may be extracted from information.

Further, the phrase "in response to" in this specification indicates that the process specified before the phrase is to be executed when the condition specified after the phrase has been met. Note that the timing at which the process is executed should be after the condition has been met, but need not be immediately after the condition is met.

Next, the process implemented by the program 17B of the embodiment will be described with reference to FIGS. 2 and 3. Note that the program 17B has the driver 17C as its component. Before the program 17B is started, the driver 17C is not stored in the memory 12 independently from the program 17B. In other words, the executed program 17B will copy in the memory 12 the driver 17C included in the program 17A as its component (this will be explained in the process of S15).

The program 17B is started in response to an operation that the user performs through the user interface 14 (hereinafter simply called a "user operation"). However, the program 17B may also be started in response to a command received from the OS 17A or another application program stored in the program area 12A.

Once started, in S11 the program 17B displays a device selection screen on the display 15. The device selection screen includes one or more device names that identify target printing devices 200. The device name is a model name, for example. The model name is an example of the type of printing device 200. A device name may be selected through a user operation. After displaying the device selection screen, in S11 the program 17B identifies the device name specified through a user operation. The process in S11 is an example of the identification process.

In S12 the program 17B displays a connecting method selection screen on the display 15. The connecting method selection screen includes a plurality of methods by which the information-processing device 100 and the printing device 200 can connect to each other after setup is complete. The connecting methods include at least a wire connection using the communication cable 300 (i.e., a USB connection) and wireless connections based on a wireless communication standard, such as Bluetooth (registered trademark) or wireless LAN. The description in the embodiment will assume that Bluetooth is used as the wireless communication standard. After displaying the connecting method selection screen, in S12 the program 17B acquires a connecting method specified through a user operation.

In S13 the program 17B determines whether the connecting method acquired in S12 is the USB connection. If the acquired connecting method is not USB connection (S13: NO), in S14 the program 17B executes a Bluetooth connection process. Specifically, the program 17B stores the driver 17C in the program area 12A and performs a setup process for enabling the information-processing device 100 to communicate wirelessly with the printing device 200 in conformance with the Bluetooth wireless communication standard.

Since the process in S14 is well known or commonly known in the art, a detailed description will not be provided here.

However, if the specified method is the USB connection (S13: YES), then in S15 the program 17B determines the driver 17C that is included in the program 17B and corresponds to the model name identified in S11, and stores this driver 17C in the program area 12A. During this storage process, the program 17B displays a screen on the display 15 showing the progress of the storage process. After completing the process in S15, in S16 the program 17B displays a notification screen 21 on the display 15. FIG. 3(A) shows an example of the notification screen 21. In this example, the notification screen 21 includes a text object representing a message for notifying the user that the storage process is complete. Steps S15 and S16 are examples of the storage process and the notification display process, respectively. The process of S16 may be executed just after the program 17B starts storing the driver 17C in the program area 12A and before storing the driver 17C is complete.

In S17 the program 17B displays a guidance screen 22 on the display 15. FIG. 3(B) shows an example of the guidance screen 22. Step S17 is an example of the display process. More specifically, the program 17B switches the display screen on the display 15 from the notification screen 21 shown in FIG. 3(A) to the guidance screen 22. In the example of FIG. 3(B), the guidance screen 22 includes a plurality of text objects 221, and a plurality of instruction objects 222. The text objects 221 include a first text object 221A, and a second text object 221B. The instruction objects 222 include a first instruction object 222A, a second instruction object 222B, and a third instruction object 222C.

The text objects 221 include messages specifying requirements for enabling the information-processing device 100 to transmit print commands to the target printing device 200. Specifically, the message in the first text object 221A includes requirements 221C and 221D. The requirement 221D is that the power to the target printing device 200 be turned on. In the example of FIG. 3(B), the message including the requirement 221D is "2. Please turn on the power for the printer." The requirement 221C is that the target printing device 200 be connected to the communication interface 13 of the information-processing device 100. The message in the example of FIG. 3(B) that includes the requirement 221C is "1. Please connect the computer to the printer with a USB cable." The second text object 221B includes a message describing a requirement and the functionality that will be obtained when the requirement is satisfied. In the example of FIG. 3(B), the portion of the message including the requirement indicates that the information-processing device 100 and the target printing device 200 are to be connected with the communication cable 300 by specifying "*When the computer and printer are connected with the USB cable, . . . " The portion of the message including the function that will be obtained indicates that the target printing device 200 can execute printing by specifying " . . . the printer can be used."

The instruction objects 222 can be selected through a user operation. Each instruction object 222 includes a different character string specifying the state of operations related to the messages included in the text objects 221. The character string may include symbols or marks. Specifically, the character string included in the first instruction object 222A is "Done" and is selected to indicate that the actions required in the messages have been completed. The character string included in the second instruction object 222B is "Later" and is selected to indicate that the actions required in the messages will be performed at a later time. The third instruction object 222C includes the mark "x" and is selected to quit the display of the guidance screen 22.

The guidance screen 22 in the example of FIG. 3(B) has messages included in the text objects 221, and the instruction objects 222. That is, the messages and the instruction objects 222 are displayed simultaneously on the display 15. Accordingly, while reviewing the messages, the user can select one of the instruction objects 222. However, as an alternative, in S17 the program 17B may first display on the display 15 a first guidance screen 22A that includes the messages (or text objects 221A and 221B), as illustrated in FIG. 3(C), and may subsequently display on the display 15 a second guidance screen 22B different from the first guidance screen 22A that includes the instruction objects 222. Through this process, the user can only select one of the instruction objects 222 after the messages have been displayed. In this case, the instruction objects 222 are not displayed until after the driver 17C has been stored in the memory 12. Thus, the program 17B can execute the process beginning from S18 that includes a command process (see S110 of FIG. 2) after the driver 17C has been reliably stored in the memory 12.

The user can confirm whether the driver 17C has been stored in the memory 12 based on whether the notification screen 21 (see FIG. 3(A)) was displayed. Further, by reading the messages included in the guidance screen 22, the user can recognize the requirements 221C and 221D. Particularly, the user can also recognize from the first instruction object 222A and the second instruction object 222B that it is possible either to take immediate measures to satisfy the requirements 221C and 221D or to take such measures later. If the user has taken measures to meet the requirements 221C and 221D prior to the guidance screen 22 being displayed or if the user takes such action as soon as the guidance screen 22 is displayed, the user specifies the first instruction object 222A in the guidance screen 22 through the user interface 14. Alternatively, the user may select the second instruction object 222B in the guidance screen 22 through the user interface 14 and may take measures to meet the requirements 221C and 221D a period of time after the guidance screen 22 is displayed. The user may also select the third instruction object 222C in the guidance screen 22 through the user interface 14. After displaying the guidance screen 22, in S18 of FIG. 2 the program 17B receives a user operation to select one of the first through third instruction objects and stores user operation information in the data area 12B specifying the selected object among the first through third instruction objects 222A-222C.

After one of the first through third instruction objects 222A-222C has been specified, in S19 the program 17B executes a deletion process to delete the unspecified device information described above. Even if the driver 17C is stored in the program area 12A after unspecified device information has been recorded (hereinafter called the "specific state"), the driver 17C stored in the program area 12A cannot be assigned to the target printing device 200 connected to the communication interface 13. In other words, the OS 17A cannot properly execute the setup process that allows the driver 17C to issue commands to the target printing device 200 connected to the communication interface 13. Based on the technical background described above, the program 17B of the embodiment deletes all unspecified device information recorded in the data area 12B. More specifically, all unspecified device information recorded for the printing device 200 is deleted.

Note that the program 17B deletes the unspecified device information in the embodiment. As an alternative, the program 17B may delete unspecified device information through the OS 17A by outputting a delete command to the OS 17A to delete the unspecified device information. In this case, the OS 17A deletes unspecified device information from the data area 12B in response to the delete command.

In S110 the program 17B outputs an execution command to the OS 17A for executing the setup process. S110 is an example of the command process. The execution command is a command forcing execution of the PO process. The OS 17A normally executes the PnP process when triggered by the signal from the connector in the communication interface 13 shifting to the prescribed voltage level, as described above. However, the OS 17A executes the forced PnP process when receiving an execution command from the program 17B. Thus, the two types of PnP processes differ according to this point.

In response to the execution command from the program 17B, in S21 the OS 17A detects whether the target printing device 200 is currently connected to the communication interface 13 via the communication cable 300 based on the signal received from the connector in the communication interface 13. The process of S21 is an example of the detection process. In S22 the OS 17A determines whether a connection with the target printing device 200 was detected. If a connection with the target printing device 200 was detected (S22: YES), in S23 the OS 17A executes the setup process. Accordingly, the setup process is executed in S23 after detecting the target printing device 200 without requiring reconnection (disconnection and connection) of the target printing device 200 from the communication interface 13. However, if OS 17A determines that a connection with the target printing device 200 was not detected (S22: NO), the OS 17A ends the process without executing the setup process.

Note that even when the OS 17A determines that a connection with the target printing device 200 was not detected (S22: NO) and ends the process without executing the setup process, the OS 17A will execute a normal PO process in response to the target printing device 200 subsequently being connected to the information-processing device 100 via the communication cable 300. Since the driver 17C is stored in the program area 12A in this case, the OS 17A will assign the driver 17C stored in the program area 12A to the target printing device 200 connected to the communication interface 13. In other words, if the user specified the second instruction object 222B in the guidance screen 22 and took measures to meet the requirements 221C and 221D some time after the guidance screen 22 was displayed, the OS 17A will execute the setup process normally. Hence, even if the OS 17A reached a NO determination in S22, a screen prompting the user to connect the target printing device 200 to the communication interface 13 is not displayed on the display 15.

In S23 the OS 17A executes the setup process. Specifically, after communicating with the target printing device 200 according to the USB standard, the OS 17A assigns the driver 17C stored in the program area 12A to the target printing device 200 connected to the communication interface 13. That is, the OS 17A executes a USB configuration process with the target printing device 200 and acquires a USB device descriptor from the target printing device 200 as ID information identifying the target printing device 200. The device descriptor includes a vendor ID, a product ID, and the like. The OS 17A extracts the vendor ID, the product ID, and the like from the USB device descriptor acquired from the target printing device 200 and records hardware information including the extracted vendor ID, the product ID, and the like in the data area 12B. The OS 17A also records driver information for the driver 17C including the extracted vendor ID and the like in the data area 12B. That is, the extracted hardware information or the ID information (the vendor ID, the product ID, and the like) and the driver information for the driver 17C are recorded in correlation with each other. If the OS 17A is Windows, the hardware information is recorded in a region in Registry concerning USB, and the driver information is recorded in a region in Registry concerning USBPrint. Subsequently, the OS 17A ends the process of the program 17B in FIG. 2, as described above.

After completing the process in S110 described above, in S111 the program 17B determines what instruction object 222 was selected based on the user operation information stored in S18. If the third instruction object 222C was selected, in S112 the program 17B ends the display of the guidance screen 22 on the display 15 and subsequently ends the process of FIG. 2. However, if the program 17B determines in S111 that the third instruction object 222C was not selected and one of the other instruction objects is selected, in S113 the program 17B displays a completion notification screen on the display 15 indicating that setup was successful, and subsequently ends the process of FIG. 2.

The embodiment achieves the following operations and effects. Under the specific state, the OS 17A cannot execute the setup process normally. Therefore, the program 17B sequentially executes the storage process for storing the driver 17C in the program area 12A and the deletion process for deleting unspecified device information from the data area 12B (S15 and S19 of FIG. 2). These processes cancel the specific state. In other words, through these processes the driver 17C is stored in the program area 12A, and the unspecified device information is no longer recorded in the data area 12B. Subsequently, the program 17B outputs an execution command to the OS 17A to force execution of the PnP process (S110 of FIG. 2). In response to this execution command, the OS 17A executes the setup process while not under the specific state (S23), thereby executing the setup process normally. Thus, the process of the program 17B prevents problems that can occur in a case where the process to delete unspecified device information is executed prior to the driver 17C being stored in the program area 12A.

Since the program 17B outputs an execution command to the OS 17A after performing the deletion process, the OS 17A can properly store the ID information in the data area 12B identifying the target printing device 200 connected to the communication interface 13.

Further, since the specific state can be resolved, the user need not have met the requirements 221C and 221D at the timing that the OS 17A executes the detection process, and the OS 17A can properly execute a setup process through the normal PnP process, provided that the user has met the requirements following execution of the detection process. Accordingly, the user need not meet the requirements 221C and 221D in order only for the OS 17A to perform the detection process.

Further, a considerable amount of time is required to store the driver 17C in the program area 12A from the beginning to the completion of the process. The program 17B displays a message on the display 15 using the guidance screen 22 displayed in the display process and receives user operations through the user interface 14. In this way, the program 17B can buy some time before executing the command process. In other words, the program 17B can execute the command process after reliably storing the driver 17C in the memory 12. Thus, the OS 17A can more reliably store the ID information in the memory 12.

The program 17B executes the command process regardless of which one of the instruction objects 222 (i.e., the first through third instruction objects 222A-222C) was specified through a user operation. Thus, the OS 17A can more reliably store the ID information in the memory 12.

The guidance screen 22 displayed on the display 15 includes the messages and instruction objects 222. Accordingly, the user can select one of the instruction objects 222 while confirming the messages, i.e., the requirements 221C and 221D. Thus, the OS 17A can more reliably execute the setup process.

In the example shown in FIG. 3(B), the program 17B has displayed on the display 15 the first guidance screen 22A that includes the messages, and subsequently the program 17B displays on the display 15 the second guidance screen 22B that differs from the first guidance screen 22A and that includes the instruction objects 222. The program 17B accepts user operations after displaying the messages in this display process. In this way, the program 17B can execute the command process after the driver 17C has been reliably stored in the memory 12. Thus, the OS 17A can more properly store the ID information in the data area 12B.

The guidance screen 22 includes the first instruction object 222A and the second instruction object 222B. The first instruction object 222A is provided in the guidance screen 22 so that the user can specify that measures to meet the requirements 221C and 221D have been completed. Further, the second instruction object 222B is provided in the guidance screen 22 so that the user can specify that such measures will be performed later. Hence, the user can intuitively select one of the first instruction object 222A and the second instruction object 222B based on how the user will respond.

The guidance screen 22 also includes the third instruction object 222C for quitting the display of the guidance screen 22. The program 17B executes the command process even if the third instruction object 222C has been selected. This prevents a situation in which the OS 17A does not execute the setup process due to the third instruction object 222C being selected.

The program 17B identifies the type of the target printing device 200 in the identification process and stores the driver 17C that is compatible with the identified type in the program area 12A in the storage process. Through these processes, the program 17B can handle setup processes for many types of drivers 17C.

Figure 4:
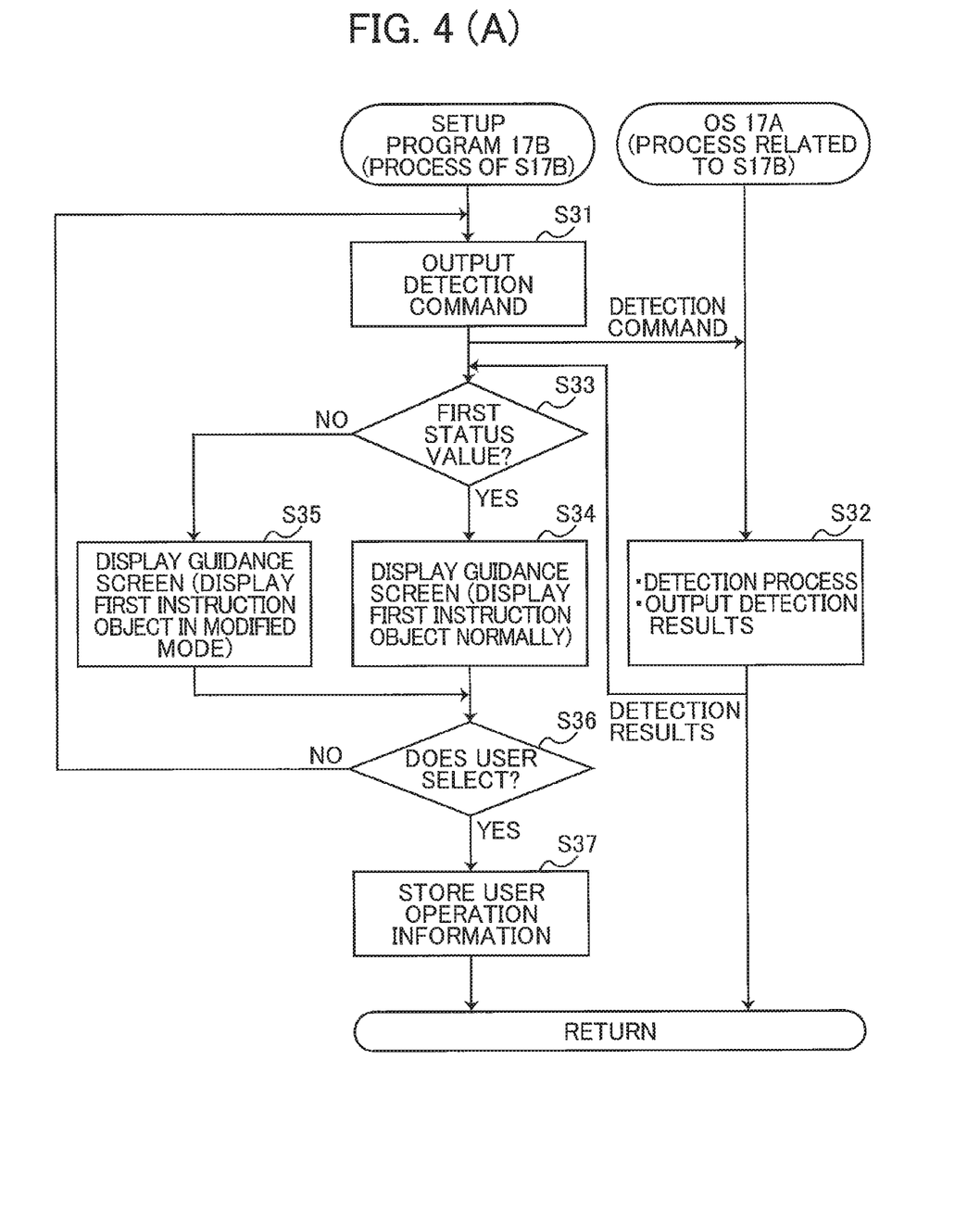
FIG. 4(A) is a flowchart illustrating a part of a process according to a setup program executed by an information-processing device according to a first variation of the embodiment.
FIG. 4(B) is a schematic diagram illustrating a guidance screen displayed while the part of the process shown in FIG. 4(A) is executed.

Next, a first variation of the embodiment will be described with reference to FIGS. 2 and 4. The program 17B according to the first variation differs from the program 17B in the embodiment in that step S17B is executed in place of step S17 in FIG. 2, and step S18 of FIG. 2 is omitted. Specifically, after executing the process in step S17B (see FIG. 4(A)), the program 17B of the first variation skips S18 in FIG. 2 and advances to S19. Below the process in S17B will be described in greater detail with reference to FIG. 4(A).

In S31 of FIG. 4(A), the program 17B outputs a detection command to the OS 17A for detecting the target printing device 200. The detection command is a command instructing the OS 17A to execute the detection process and requesting the OS 17A to return the results of the detection process to the program 17B.

In response to the detection command received from the program 17B, in S32 the OS 17A executes the same detection process described in the embodiment (see S21 of FIG. 2) and outputs information specifying the detection results (hereinafter simply called the "detection results") to the program 17B. The detection results include one of a first status value and a second status value. The first status value indicates that the target printing device 200 is currently connected to the communication interface 13. The second status value differs from the first status value and indicates that the target printing device 200 is not currently connected to the communication interface 13.

In S33 the program 17B determines whether the detection results inputted from the OS 17A have the first status value. In other words, the program 17B determines whether the target printing device 200 is connected to the communication interface 13 via the communication cable 300. The program 17B advances to S34 when determining that the detection results have the first status value (S33: YES), and advances to S35 when determining that the detection results do not have the first status value (S33: NO).

In S34 the program 17B displays the guidance screen 22 shown in FIG. 3(B) on the display 15. In the first variation, the character string in the first instruction object 222A of the guidance screen 22 has a first color, and the background color for the character string is a second color that differs from the first color. Hereinafter, the display of the first instruction object 222A having this color scheme will be called the normal display of the first instruction object 222A.

In S35 the program 17B displays the first instruction object 222A of the guidance screen 22 in a display mode different from that of the first instruction object 222A displayed in S34, as illustrated in FIG. 4(B). Specifically, the first instruction object 222A is displayed in a manner that the user cannot select through the user interface 14. Further, in this case, the background color for the character string in the first instruction object 222A shown in FIG. 4(B) is modified to a third color. The third color is a color such as gray that enables the user to recognize that the first instruction object 222A cannot be selected by the user interface 14. On the other hand, the second color is a color by which the user can recognize that the first guidance screen 22A can be selected. When the third color is gray, the second color is a color other than gray. The first color is a color that the user can perceive when contrasted with the second color.

After completing step S34 or S35, in S36 the program 17B determines whether the user has selected one of the first through third instruction objects 222A-222C within a prescribed time following execution of S34 or S35. If the program 17B determines that a selection was not made through a user operation (S36: NO), the program 17B returns to S31 and repeats the process described above. However, if the program 17B determines that a selection was made through a user operation (S36: YES), the program 17B advances to S37.

In S37 the program 17B stores user operation information in the data area 12B indicating which of the first through third instruction objects 222A-222C was selected, thereby completing the process of S17B. Subsequently, the program 17B advances to S19 of FIG. 2.

In the process of FIG. 4(A) described above, the program 17B repeats the process from S31 to S36 until the user has selected one of the first through third instruction objects 222A-222C. Thus, when the printing device 200 was connected to the information-processing device 100 with the communication cable 300 prior to one of the first through third instruction objects 222A-222C being selected, in S34 the program 17B displays the first instruction object 222A normally in the guidance screen 22. On the other hand, if the printing device 200 is not connected to the information-processing device 100 with the communication cable 300 prior to one of the first through third instruction objects 222A-222C being selected, in S35 the program 17B displays the first instruction object 222A in the modified display mode, which is modified or different from that displayed in S34, in the guidance screen 22. Hence, the user can recognize whether the printing device 200 is connected to the information-processing device 100 through the communication cable 300 when viewing the first instruction object 222A in the guidance screen 22.

Note that in S35 the program 17B may alter the shape of the first instruction object 222A from that displayed in S34. Alternatively, the program 17B may apply a specific mark to the first instruction object 222A in S35 and not provide the specific mark in S34. Hence, various methods may be used for modifying the display mode of the first instruction object 222A between S34 and S35.

As another alternative, the guidance screen 22 displayed in S35 may have an instruction object that includes the character string "Next" in place of the first instruction object 222A and the second instruction object 222B. The user then selects this instruction object to direct the program 17B to continue on to the process beginning from S19, irrespective of whether the requirements 221C and 221D have been satisfied.

Next, second and third variations of the embodiment will be described with reference to FIGS. 5(A)-5(C).

The program 17B according to the second variation differs from the first variation shown in FIG. 4(A) as follows. When the program 17B determines in S33 that the detection results have the first status value (S33: YES), rather than executing the processes in S34 and S36 (see FIG. 4(A)), in S38 of FIG. 5(A) the program 17B stores information equivalent to the user operation information (hereinafter called "equivalent information") in the data area 12B indicating that one of the first instruction object 222A and the second instruction object 222B was selected through a user operation. All other steps in the process of FIG. 5(A) are identical to those in FIG. 4(A). The framed section formed of a chain line in FIG. 5(A) is the section of the process that includes the difference from FIG. 4(A). After completing the process in S38, the program 17B exits the process in FIG. 4(A) and advances to S19 of FIG. 2. Note that the program 17B executes S111 of FIG. 2 by treating the equivalent information as user operation information specifying that one of the first instruction object 222A and the second instruction object 222B was selected through a user operation.

Figure 2:
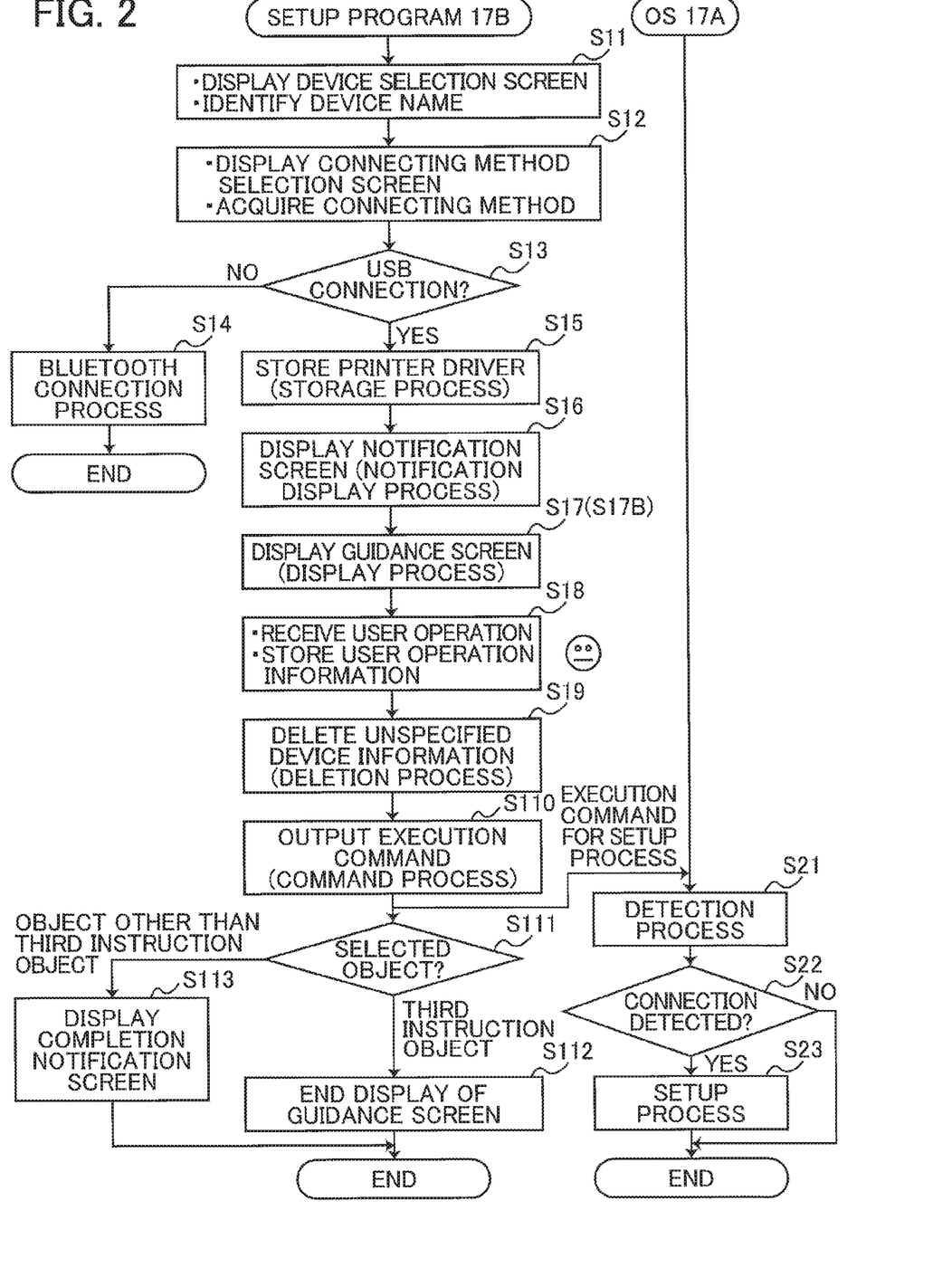
FIG. 2 is a flowchart illustrating a process according to a setup program executed by the information-processing device.
Figure 3:
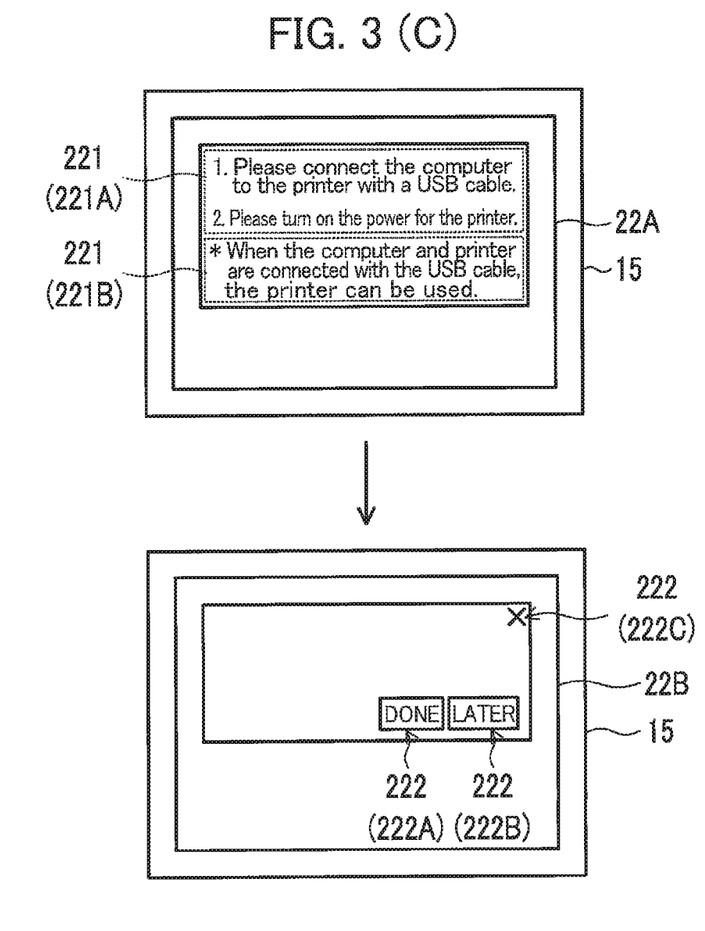
FIG. 3(A) is a schematic diagram illustrating a notification screen.
FIG. 3(B) is a schematic diagram illustrating a guide screen.
FIG. 3(C) is a schematic diagram illustrating transitioning from a first guidance screen to a second guidance screen.

Thus, when the detection results have the first status value in the second variation, in S111 of FIG. 2 the program 17B determines that the third instruction object 222C was not selected based on the equivalent information, and advances to S113. In other words, the program 17B executes the process of S113 in FIG. 2 without requiring the user to perform an operation on the user interface 14, thereby reducing the number of required user operations.

Note that S37 may be executed when the process of S33 is executed again after displaying the guidance screen 22. For example, when in the first execution of S33 the detection results have the first status (S33: NO), in S35 the guidance screen 22 is displayed. Thereafter, if NO determination is made in S36, the processes of S31-S33 are executed again. In this case, the program 17B may receive the detection results have the first status value in the secondly executed processes of S31-S33 and thus YES determination is made in S33. In this case, the program 17B proceeds to S38 for storing the equivalent information.

The program 17B may execute a similar process of S38 in S37. In this case, in S37, the program 17B stores the equivalent information when the first instruction object 222A or the second instruction object 222B is selected. On the other hand, when the third instruction object 222C is selected, the program 17B stores the user operation information indicating that the third instruction object 222C is selected. Alternatively, in S37 the program 17B may store the equivalent information regardless of which the user select an instruction object among the first through third instruction objects 222A-222C.

Figure 5:
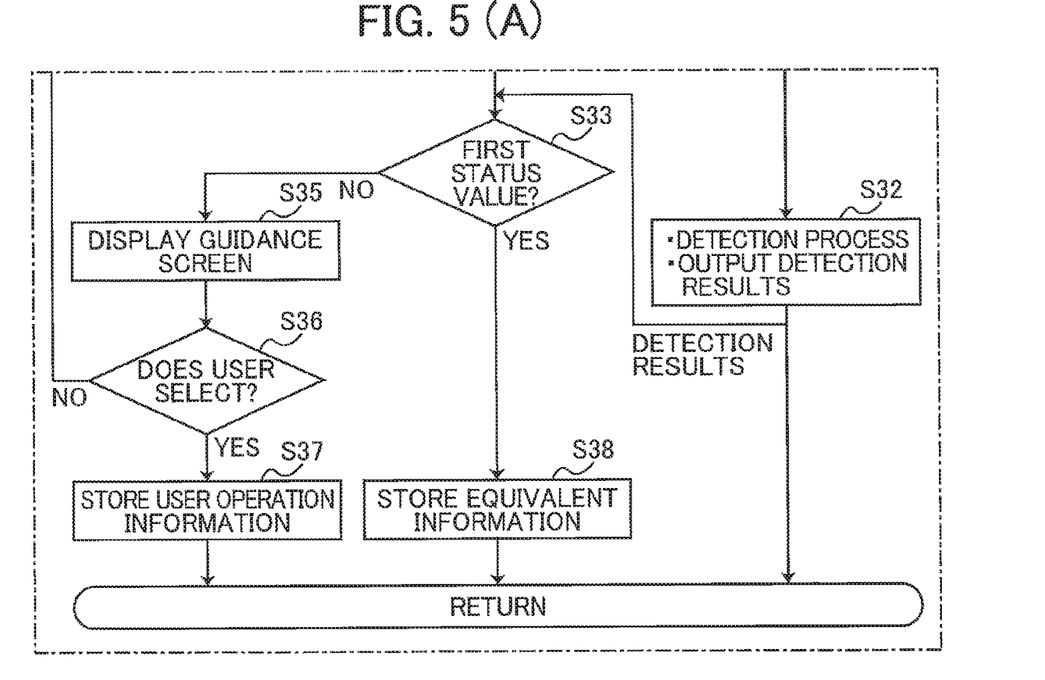
FIG. 5(A) is a flowchart illustrating a part of a process according to a setup program executed by an information-processing device according to a second variation of the embodiment.
FIGS. 5(B) and 5(C) are flowcharts illustrating parts of a process according to a setup program executed by an information-processing device according to a third variation of the embodiment.

The program 17B according to the third variation shown in FIG. 5(B) is similar to the second variation in FIG. 5(A) in that the program 17B exits the process of FIG. 5(A) without executing step S34, S36, and S37 in FIG. 4(A) when determining that the detection results have the first status value (S33: YES). In the third variation as shown in FIG. 5(B), when the detection results have the first status value (S33: YES), the user operation information is not stored in the data area 12B (S38 in FIG. 5(A) is not executed). The program 17B according to the third variation also differs from the process in FIG. 2 with the addition of a step S114 between steps S110 and S111, as shown in FIG. 5(C). In S114 the program 17B determines whether user operation information is stored in the data area 12B. The program 17B advances to S111 when determining that user operation information is stored in the data area 12B (S114: YES), and advances to S113 when determining that user operation information is not stored in the data area 12B (S114: NO). The remainder of the process in FIG. 5(C) is identical to that in FIG. 2. The framed section formed of a chain line in FIG. 5(C) is the section of the process that includes points of difference from FIG. 2.

When the detection results have the first status value in the third variation (S33: YES), the program 17B executes steps S114 and S113 in FIG. 2 without requiring a user operation on the user interface 14, thereby reducing required user operations.

Note that the program 17B in the third variation may skip the process in S111 and execute the process in S112 when reaching a NO determination in S114.

Next, other variations of the embodiment will be described. The printing device 200 is used as an example of the device in the embodiment and the first through third variations. However, the device is not limited to the printing device 200, provided that the device can be connected to the communication interface 13 of the information-processing device 100 through the communication cable 300. Examples of other devices include a scanner, a digital camera, a 3D printer, a sewing machine, a laser marking machine, and a machine tool.

Further, while the notification screen 21 and the guidance screen 22 constitute separate screens in the embodiment and the first through third variations, the content of one of the notification screen 21 and the guidance screen 22 may be included with the content of the other.

The communication cable 300 may conform to a PnP standard other than the USB standard. The program 17B can be applied to PnP standards other than the USB standard, provided that the OS 17A has a feature for recording information in the memory 12 indicating that the printing device 200 connected to the information-processing device 100 through the communication cable 300 is an unspecified device if the driver 17C for the printing device 200 has not been set up on the information-processing device 100. The program 17B may also be applied to network PnP when, for example, the information-processing device 100 and the printing device 200 communicate wireless in accordance with Bluetooth (registered trademark) and the OS 17A possesses the feature described above.

What is claimed is:

1. A non-transitory computer readable storage medium storing a set of program instructions installed on and executed by an information-processing device having a controller, a memory, and a communication interface, the memory storing an OS configured to execute a plug and play process for a target device that is connected to the communication interface, the set of program instructions comprising:
   executing a storage process to store a driver in the memory, the driver being a software supporting the target device and for outputting commands to the target device, wherein in a case where the memory does not store the driver, the OS executes the plug and play process for the target device triggered by connection of the target device to the communication interface, and records in the memory unspecified device information indicating that unknown device is found, wherein in a case where the OS detects the unspecified device information stored in the memory, the OS does not complete a setup process to install driver so that the driver is enabled to output the commands to the target device even if the memory stores the driver; and
   executing, after executing the storage process, a deletion process to delete the unspecified device information from the memory so that the OS can complete the setup process to install the driver triggered by connection of the target device to the communication interface.

2. The non-transitory computer readable storage medium according to claim 1, wherein the set of program instructions further comprises outputting to the OS an execution command ordering the OS to execute the setup program after the deletion process.

3. The non-transitory computer readable storage medium according to claim 2, wherein the execution command includes a command to execute the plug and play process,
   wherein in response to receiving the execution command, the OS executes a detection process detecting the target device connected to the communication interface without requiring reconnection of the target device to the communication device, and thereafter executes the setup process.

4. The non-transitory computer readable storage medium according to claim 2, wherein the information-processing device further includes a display and a user interface,
   wherein the set of program instructions further comprises displaying a message prompting a user to perform at least one of an action to turn on the target device and an action to connect the target device to the communication interface and displaying an instruction object selectable through the user interface,
   wherein in response to receiving selection operation of the instruction object through the user interface, the execution command is outputted to the OS.

5. The non-transitory computer readable storage medium according to claim 4, wherein the displaying displays a plurality of instruction objects selectable through the user interface, the plurality of instruction objects having character strings different from each other, each of the plurality of instruction objects indicating an operation in response to the displayed message,
   wherein the outputting the execution command is executed irrespective of selected one of the plurality of instruction objects.

6. The non-transitory computer readable storage medium according to claim 4, wherein the displaying displays a screen including both the message and the instruction object.

7. The non-transitory computer readable storage medium according to claim 4, wherein the displaying displays a first screen which includes the message, and subsequently displays a second screen different from the first screen, the second screen including the instruction object.

8. The non-transitory computer readable storage medium according to claim 4, wherein the instruction object includes a first instruction object having a character string indicating an action prompted by the message has been completed.

9. The non-transitory computer readable storage medium according to claim 4, wherein the displaying includes:
   determining whether the target device is connected to the communication interface;
   displaying, in response to determining that the target device is connected to the communication interface, a first instruction object representing a character string indicating an action prompted by the message has been completed; and
   displaying, in response to determining that the target device is not connected to the communication interface, another instruction object representing a character string, which is same as that in the first instruction object, in a manner different from that of the first instruction object.

10. The non-transitory computer readable storage medium according to claim 4, wherein the instruction object has a character string indicating an action prompted by the message has been completed,
    wherein the set of program instructions further comprises:
    determining whether the target device is connected to the communication interface; and
    displaying the instruction object in response to determining that the target device is not connected to the communication interface,
    wherein in response to determining that the target device is connected to the communication interface, the displaying the instruction object is not executed.

11. The non-transitory computer readable storage medium according to claim 4, wherein the instruction object includes a character string indicating that an action prompted by the message is to be performed at a later time.

12. The non-transitory computer readable storage medium according to claim 4, wherein the displaying displays a screen including both the message and the instruction object,
    wherein the instruction object indicates an operation to end displaying the screen.

13. The non-transitory computer readable storage medium according to claim 1, wherein the set of program instructions further comprises executing an identification process to identify a type of the target device which is a target for the setup process,
    wherein the storage process stores the driver supporting the type of the target device in the memory.

14. The non-transitory computer readable storage medium according to claim 1, wherein the information-processing device further includes a display,
    wherein the set of program instructions further comprises displaying a notification notifying that the storage process is complete on the display before executing the deletion process.

15. An information-processing device comprising:
    a communication interface;

a memory storing an OS configured to execute a plug and play process for a target device that is connected to the communication interface; and a controller configured to perform:

executing a storage process to store a driver in the memory, the driver being a software supporting the target device and for outputting commands to the target device, wherein in a case where the memory does not store the driver, the OS executes the plug and play process for the target device triggered by connection of the target device to the communication interface, and records in the memory unspecified device information indicating that unknown device is found, wherein in a case where the OS detects the unspecified device information stored in the memory, the OS does not complete a setup process to install driver so that the driver is enabled to output the commands to the target device even if the memory stores the driver; and executing, after executing the storage process, a deletion process to delete the unspecified device information from the memory so that the OS can complete the setup process to install the driver triggered by connection of the target device to the communication interface.

* * * * *